United States Patent [19]

Earnhart

[11] 4,014,585
[45] Mar. 29, 1977

[54] AUTOMOBILE BODY CONSTRUCTION
[75] Inventor: Thomas P. Earnhart, Fort Smith, Ark.
[73] Assignee: Armbruster/Stageway, Inc., Fort Smith, Ark.
[22] Filed: Aug. 19, 1975
[21] Appl. No.: 605,902
[52] U.S. Cl. .................................. 296/16; 296/150
[51] Int. Cl.$^2$ .......................................... B60P 3/26
[58] Field of Search ............. 296/16, 17, 18, 28 R, 296/28 A, 28 K, 150; D12/91, 92

[56] References Cited
UNITED STATES PATENTS

| | | | |
|---|---|---|---|
| 1,621,675 | 3/1927 | Masury | 296/28 A |
| 1,830,376 | 11/1931 | Silver | 296/16 |
| 1,869,274 | 7/1932 | Phillips | 296/13 |
| 1,968,205 | 7/1934 | Heise | 296/16 |
| 2,212,674 | 8/1940 | Swift | 296/17 |
| 2,425,948 | 8/1947 | Lucien | 296/28 A |
| 2,606,058 | 8/1952 | Chausson | 296/28 A |
| 3,539,201 | 11/1970 | Loew | 296/28 R |
| 3,550,950 | 12/1970 | Pollock | 296/28 |
| 3,794,374 | 2/1974 | Manning | 296/28 A |
| D220,387 | 4/1971 | Geiger | D12/92 |

Primary Examiner—Joseph F. Peters, Jr.
Assistant Examiner—John A. Carroll
Attorney, Agent, or Firm—Walter S. Murray

[57] ABSTRACT

An automobile body construction of the type to convert a conventional four passenger sedan to a three, full bench seated, six door limosine that will conveniently seat and convey nine passengers in comfort; the limosine being custom made for use as an airport bus, funeral car, or the like.

A special center door and its window glass is provided to secure economies of manufacture for the custom limosine body construction.

3 Claims, 5 Drawing Figures

AUTOMOBILE BODY CONSTRUCTION

This invention relates to passenger conveying, land vehicles and is particularly directed to a novel automobile body construction adapted to convert a conventional four passenger sedan to a three, full bench seated, six door limousine that will conveniently seat and convey nine passengers in comfort.

It is the principal object of this invention to provide an automobile body extending section including a door and its window glass which provides economies of manufacture while securing a practical yet comfortable body design.

Another object of the invention is to provide an automobile body extending section that does not require an upper center door frame; the opening above the center door having a continuous weatherstrip across the top and opposite sides of the opening which engages a slidable window glass wholly supported within the center door and engaging and supported by the weatherstrip whereby to effectively seal the glass in closed position or in its intermediate positions between a fully closed and opened window condition.

A further object of the invention is to provide an automobile body extending section having the foregoing characteristics that is readily incorporated into a conventional, luxury sedan, to eliminate the need for uncomfortable folding jump seats and provide a custom limousine capable of comfortably seating up to nine passengers.

These and other objects will become apparent from the following specification, taken in conjunction with the accompanying drawings, wherein.

Figure 1:
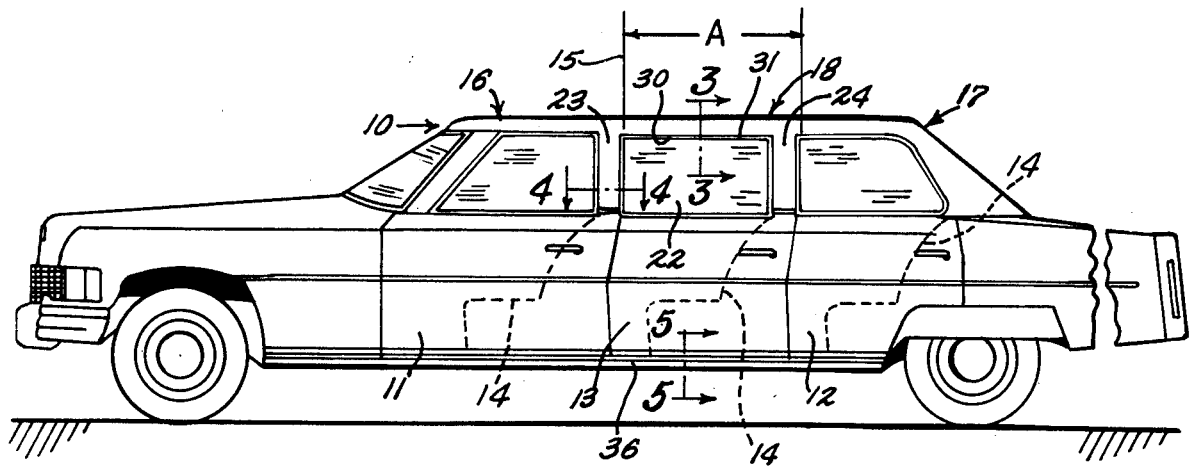
FIG. 1 is a fragmental, side elevational view of a limousine embodying the features of this invention.
Figure 3:
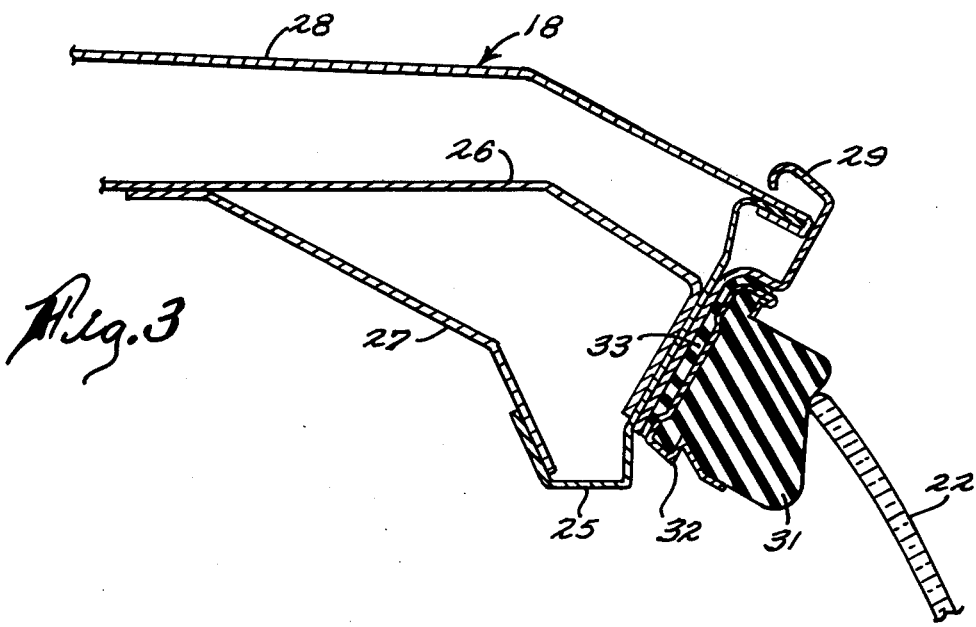
Figure 4:
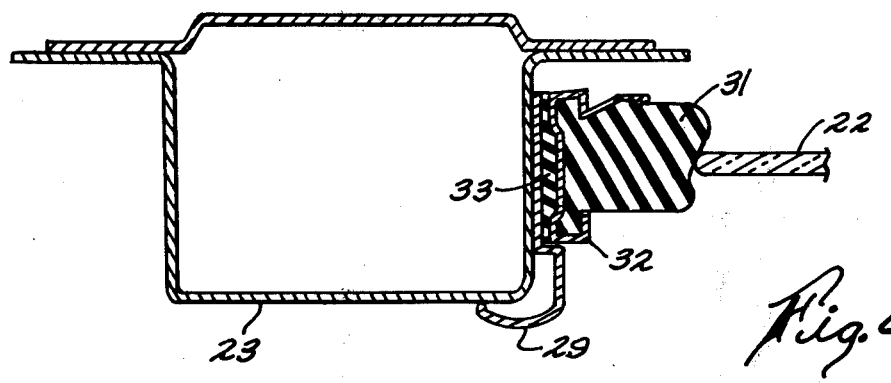
Figure 5:
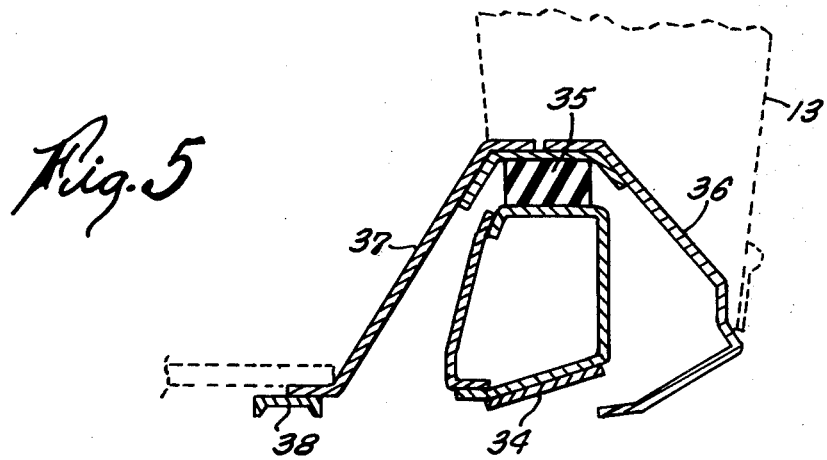

FIGS. 3, 4 and 5 are enlarged sections taken on lines 3—3, 4—4 and 5—5, respectively, of FIG. 1.

With particular reference to FIG. 1 of the drawings, the numeral 10 indicates a custom made automobile body having a pair of front side doors 11, a pair of rear side doors 12 and a pair of center side doors 13, each hinged in the conventional manner to upstanding body posts. Each pair of doors provides access and egress of passengers to a full width bench seat 14, each seat being indicated in FIG. 1 of the drawings by dotted lines.

The automobile body 10 is custom made from a conventional four passenger sedan that had front side doors 11 and rear side doors 12 and divided in two parts along a lateral plane indicated in FIG. 1 of the drawings by the reference numeral 15, the severed front body section 16 and the severed back body section 17 being separated a distance A and a body extending section 18 built up between and rigidly connected to said severed front and back body sections.

Figure 2:
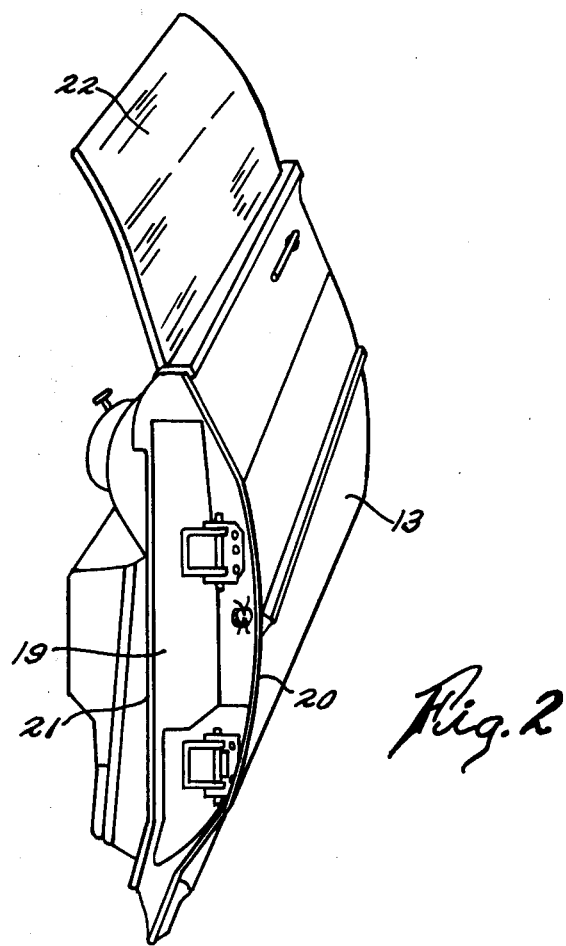
FIG. 2 is a perspective view of the center door and glass of a body extending section for the limousine depicted in FIG. 1.

The body extending section 18 is devised to accept and mount the pair of laterally opposed center doors 13—13, one of which is depicted in FIG. 2 of the drawings, said door 13 having a door hinge pillar 19, an outer panel 20, an inner panel 21 and a door window glass 22 mounted wholly within the confines of the door for movement into and out of the upper portion thereof; a glass operating device (not shown) being provided to "open" and "close" the door glass in the usual manner. The door 13 is hinged to an upstanding body post 23 of the front, original body section 16 and best shown in section in FIG. 4 of the drawings; a similar body post 24 being added by welding, or the like, to the original back body section 17, the latter including a latch keeper (not shown) for engagement with the usual latch on the center door 13.

With reference to FIG. 3 of the drawings the body extending section 18 includes a roof header 25 (FIG. 3) and support member 26 linking similar parts of the front and rear body sections together in a rigid unit, said header having an inner panel 27 and an outer panel 28. A chrome door molding 29 is secured to the roof header 25 and extends across the top of the center door window opening 30 in which the window glass 22 moves to "open" or "close" the window in the opening. A rubber weatherstrip 31 is set in a retainer 32 which in turn is secured to the header 25, a sealer 33 being interposed between a retainer and the molding.

With reference to FIG. 4 it will be seen that the rubber weather strip 31, its retainer 32, sealer 33 and the chrome door molding 29 have an inverted, U-shaped configuration, the legs thereof continuing down the posts 23 and 24 from the ends of the weatherstrip portion that extends across the top of the door; the bottom of the legs of said weatherstrip engaging the top portion of the door 13. The window glass therefore, in fully closed position, engages the weatherstrip along its side edges and across its upper edge to insure a tight weatherproof seal for the center door glass in window closed condition and also provides a positive guide and lateral support means for the glass in its intermediate positions between window closed and opened condition.

FIG. 5 of the drawings depicts the manner of extending the original vehicle chassis to accept the body structure of this invention, the composite frame member 34 having its ends welded to the severed ends of the original frame. The frame member 34 supports a rubber body mount 35, an outside rocker panel 36, an inside rocker panel 37 and a floor support member 38.

It will therefore be understood that I have provided an economical, simplified, yet rugged and effective body construction adapted to convert a conventional four door, four passenger sedan to a six door, nine passenger limousine by means of a specially designed section containing a center door and its window glass arrangement, said limousine being custom made for use as an airport bus, a funeral car, or a like vehicle for the comfortable conveyance of up to nine passengers.

What is claimed is:

1. In combination with a passenger conveying, automobile body having a central side door opening therein bounded by longitudinally spaced apart, upstanding posts and a top body extending section having its end portions joined to the top end portions of the posts to define said opening, a door hinged to one said post and adapted to be latched to the other said post and closing the bottom portion of said central opening, a window glass mounted in the door for movement between open and closed positions in that portion of the central opening above said door, a continuous, inverted U-shaped weatherstrip positioned along the top body extending section and down the confronting faces of the door posts to the top portion of the door, the side portions of the weatherstrip continuously engaging and guiding the window glass, and the top edge of said door glass engaging the weatherstrip across the top body extending section when the glass is in closed position.

2. In the passenger conveying automobile body set forth in claim 1 wherein the weatherstrip includes metal molding fixed to the top body extending section and to the posts, a resilient seal strip, and a retainer for the strip mounted to the molding.

3. In the passenger conveying automobile body set forth in claim 2 wherein the body comprises severed front and back body sections of a conventional four door sedan, one upstanding post is mounted on the front section and the other upstanding post is added to the rear body section, and the body extending section has its end portions joined to the top end portions of the posts.

* * * * *